July 20, 1926.

K. RIESER ET AL

VEHICLE SPRING

Filed July 11, 1924

1,593,507

Inventors
Karl Rieser, and
Carl Guttinger
By B. Singer, Atty.

Patented July 20, 1926.

1,593,507

UNITED STATES PATENT OFFICE.

KARL RIESER AND CARL GUTTINGER, OF BERLIN, GERMANY.

VEHICLE SPRING.

Application filed July 11, 1924, Serial No. 725,445, and in Germany November 24, 1923.

This invention relates to a spring support for vehicles of all kinds, particularly for automobiles and the chassis of air craft, the spring support comprising angular springs which are wound in helical shape near the points, the ends of the springs being connected with the axis of the vehicle and with the chassis. The invention also rests in the fact that the ends of the springs are displaceable in their bearing supports for the purpose of proper adjustment, one end of a spring being constructed as a rack bar and being displaceable by means of a suitable pinion engaging the rack and disposed on the frame.

The drawings show an embodiment of the invention.

Figure 1:
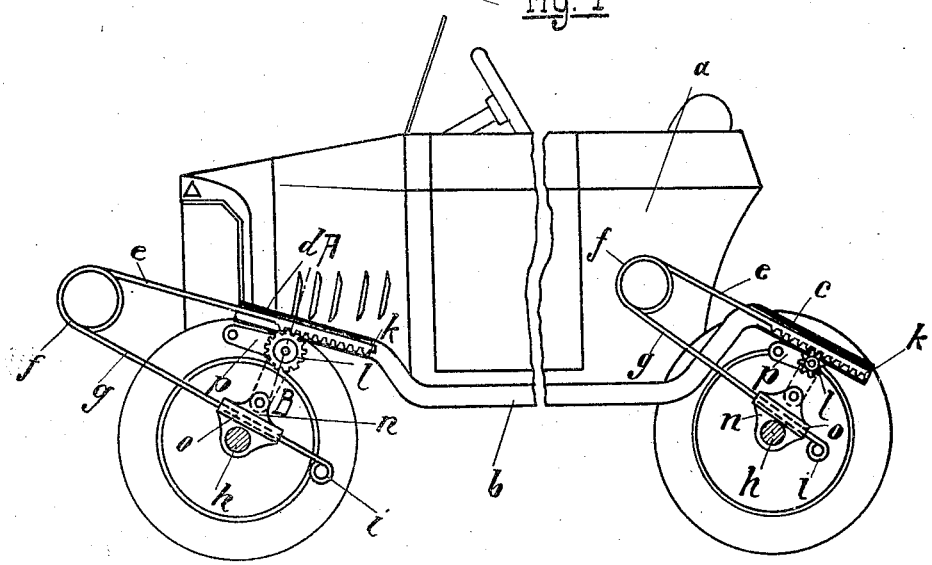
Figure 1 is a side elevation of the device.
Figure 2:
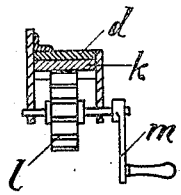
Figure 2 is a section on line A—B of Figure 1.

The body $a$ of the vehicle is supported on the chassis $b$ which terminates at both ends in the slanting arms $c$ and $d$. These two arms are about parallel and receive the upper arms $e$ of the U-shaped springs, the arms $e$ and $g$ of which are connected together by the coil $f$, the shank $g$ being also connected to the axle $h$. The arm $g$ is provided at its end with a reinforced portion $i$. The arm $e$ is provided with a rack bar $k$ by means of which a displacement of the spring is made possible through the pinion $l$ and crank $m$.

The arm $g$ of the spring is supported in a sleeve $n$ resting on the axle $h$, said sleeve or bushing being closed by a cover $o$. The cover $o$ is pressed against the spring in case of use. In order to do away with the spring support an auxiliary prop $p$ is used which permanently maintains the exact distance between the frame and the axle of the wheel. This prop $p$ is tilted on the frame when the vehicle is to be used and is held therein.

As may be seen from the drawing the frame for the rear wheel extends beyond the vehicle frame. Hence the rear axle is moved outward and the vehicle body thereby seems to be supported loosely only so that shocks cannot be felt by the passengers in the body of the vehicle. The spring support for the rear wheels of the vehicle is otherwise the same as the support for the front wheels.

Having thus described our invention, we claim:

Spring supporting means for automobiles comprising U-shaped springs the arms of which are connected together by coils, the arms of the springs being connected with the wheel frame and the body frame, one of said arms being provided with rack teeth and a pinion engaging said rack teeth and having fixed bearings, the ends of the springs being displaceable in their bearings to permit adjustment of the same.

In testimony whereof we have signed our names to this specification.

KARL RIESER.
CARL GUTTINGER.